Figure 1:
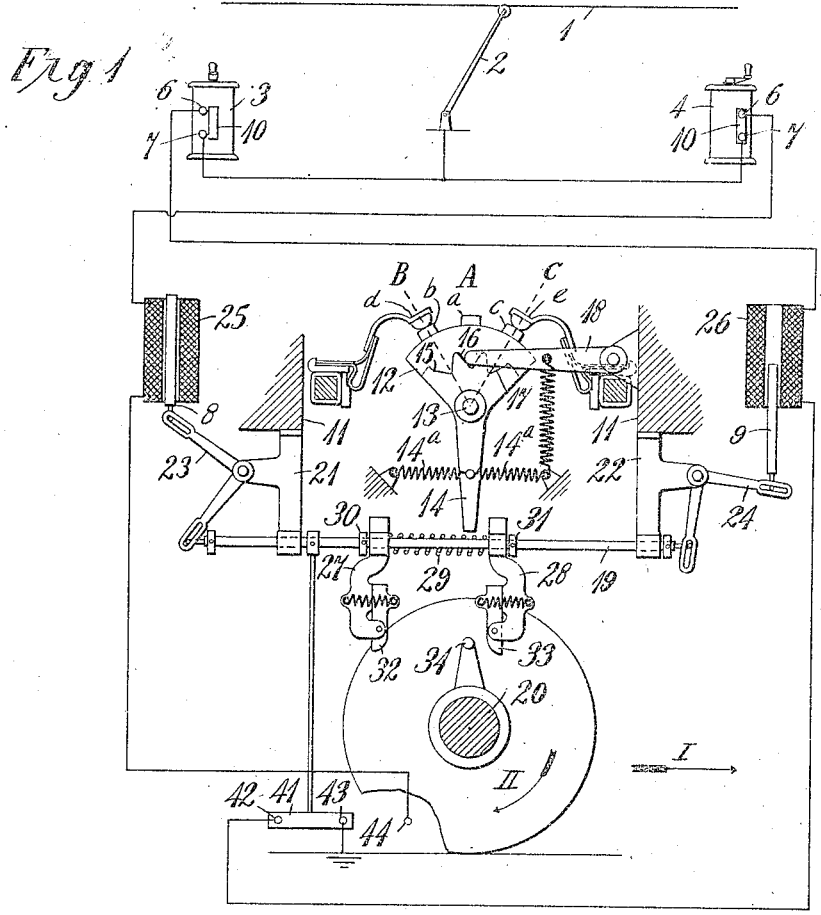

P. S. TURNER.
ELECTRIC BRAKING SYSTEM.
APPLICATION FILED MAY 22, 1913.

1,179,478.

Patented Apr. 18, 1916.

WITNESSES:
Fred H. Miller
W. R. Coley

INVENTOR
Percy S. Turner
BY
Wesley G. Carr
ATTORNEY

UNITED STATES PATENT OFFICE.

PERCY STUART TURNER, OF CHORLTON-CUM-HARDY, ENGLAND, ASSIGNOR TO WESTINGHOUSE ELECTRIC AND MANUFACTURING COMPANY, A CORPORATION OF PENNSYLVANIA.

ELECTRIC BRAKING SYSTEM.

1,179,478.  Specification of Letters Patent.  Patented Apr. 18, 1916.

Application filed May 22, 1913. Serial No. 769,330.

*To all whom it may concern:*

Be it known that I, PERCY S. TURNER, a subject of the King of Great Britain, and a resident of Chorlton-cum-Hardy, in the county of Lancaster, England, have invented a new and useful Improvement in Electric Braking Systems, of which the following is a specification.

My invention relates to electric brakes for electrically propelled railway and like vehicles and it has for its object to provide an improved device by means of which such vehicles may be prevented from accidental running backward downhill.

The chief feature of my invention is the provision of means whereby, whenever the vehicle commences to run backward a local circuit is automatically established and a braking current is generated by the vehicle motors independently of the motorman and independently of the position of the motor controller handle.

According to my invention, a control switch hereinafter termed the "run-back" switch, independent of the usual motor controller is provided with mechanism which is operatively connected with one of the rotary shafts or axles of the vehicle in such a manner that so long as the vehicle is moving in the forward direction, the switch remains in a position in which the connections of the motors to the power circuit and to the local brake circuit may be governed in the ordinary manner by the motor controller. Should, however, the vehicle run backward, the mechanism automatically operates the run-back switch to break the connections between the motors and the ordinary controller and connect the motors in a local circuit independently of the controller and thereby produce a braking current which will have a retarding effect upon the vehicle.

In connection with the switch mechanism, electro-magnetic devices are preferably provided which are respectively controlled by a switch or by the controller at each end of the vehicle. These devices are actuated at the beginning of a journey to put the switch mechanism into a position in which it will be properly operated by the backward movement of the vehicle; if this happens at any time. Said devices may also serve the purpose of restoring the run-back switch to its middle or normal position after it has moved to effect a braking of the vehicle, such resetting of the run-back switch being necessary when it is desired to start the vehicle in the forward direction again.

In order that the nature of the invention may be clearly understood, a method of carrying out the same in practice will now be more particularly described with reference to the accompanying drawing, in which—

Figure 2:
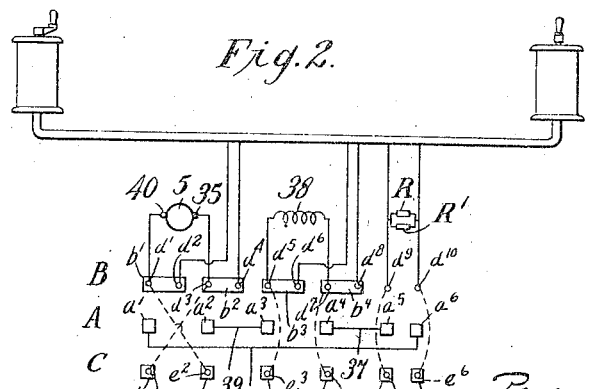

Figure 1 shows diagrammatically part of an electric railway vehicle upon which are provided a run-back switch together with controlling mechanism therefor according to my invention, the forward direction of travel of the vehicle being indicated by the arrow I, and Fig. 2 is a diagram of the electric connections controlled by the run-back switch when in each of its two operative positions.

Referring to the drawing, according to the arrangements shown, a trolley wire 1 supplies electrical energy through a trolley 2 and one of the two controllers 3 and 4 for driving a motor 5 (Fig. 2). In the preferred arrangement, each of the controllers is provided with a pair of special contact fingers 6 and 7 and a coöperating contact plate 10 for controlling the electro-magnetic setting and re-setting devices of the run-back switch, as will be hereinafter described.

The run-back switch 12 is shown as being of the drum controller type arranged with its shaft 13 supported in a horizontal position and provided with a depending lever 14 for rotating the switch and having a plurality of notches 15, 16 and 17 formed in a suitable part thereof and coacting with a spring-controlled lever 18 for defining the respective positions A, B and C, into which the run-back switch may be moved. The switch is provided with three sets $a$, $b$ and $c$ of movable contact pieces, the separate contact pieces of each set being shown in Fig. 2. Of these movable contact pieces only the set $a$ is used for short circuiting the motors in a local braking circuit, and this is effected whenever the switch lever 14 is moved into either of its operative positions B and C.

When the switch lever 14 is in the position A, in which it is shown in the drawing, the set $b$ of movable contact pieces completes the usual motor circuits through a set $d$ of fixed contact fingers, the set $a$ of braking contact pieces being out of circuit and inoperative, while the set $c$ of contact pieces merely has the function of supporting in proper operative position a set $e$ of fixed spring contact fingers which are electrically cross connected with certain of the contact fingers of the set $d$, as shown in dotted lines in Fig. 2.

In order to automatically move the lever 14, and with it the run-back switch 12, from its inoperative position A into one of its operative positions, for instance, C in the case illustrated, whenever the vehicle runs backward, the following means are provided: A slidable bar 19 is supported in proximity to one of the vehicle wheel axles 20 in a plurality of bearing brackets 21 and 22 that are suitably secured to the under frame 11, and the ends of said bar are operatively connected to the cores 8 and 9 of a plurality of solenoids 25, 26 by means of bell crank levers 23, 24 that are pivotally supported by the brackets 21 and 22. Upon the bar 19, are loosely mounted two tappets 27 and 28 with a spring 29 disposed between them to normally force them outwardly against collars 30 and 31, which are fixed upon the slidable bar 19. The tappets 27 and 28 are respectively provided with one-way pawls 32 and 33, either of which may be disposed to engage a cam or projection 34 keyed upon the wheel axle 20. The slidable bar 19 is designed to occupy one of two definite positions, corresponding to the switch positions B and C, into which it can be moved by energizing either of the solenoids 25 and 26. When the solenoid 25 is energized, the slidable bar 19 is drawn to the left by means of the bell crank lever 23 and the tappet 28 is thus brought close to the right hand side of the lever 14 of the run-back switch 12 as shown in the drawing. On the other hand, when the solenoid 26 is energized, the slidable bar 19 is moved to the right by means of the bell crank lever 24, and the tappet 27 is thus moved close to the left hand side of the lever 14 of the run-back switch 12. When the parts occupy the positions shown in the drawing, the device is set for traveling in the forward direction to the right as shown by arrow I.

The operation of the device is as follows: As the axle 20 rotates in the forward direction, once in each revolution, the projection 34 engages the one-way pawl 33 of the tappet 28. As the said pawl is adapted to move to allow the cam 34 to pass, no movement is imparted to the tappet 28 so long as the axle 20 rotates in the forward direction. In case, however, the axle 20 should rotate in the opposite direction, that is, to the left, as shown, the projection 34 would strike the opposite side of the pawl 33 and thus move the whole tappet 28 to the left. By this movement, the tappet 28 engages the lever 14 of the run-back switch 12 and rotates it into the operative position C and, at the same time, compresses the spring 29 which is disposed between the two tappets. As soon as the projection 34 becomes disengaged from the tappet 28, the latter is returned by the spring 29 to its normal position against the fixed collar 31, while the run-back switch 12 remains in the position to which it has been moved by the tappet 28, the two light springs 14ª, shown in the drawing as connected to the lever 14, being optionally provided merely to assist in correctly centering said lever; but said springs are not sufficiently powerful to return the switch from an operative into an inoperative position against the friction of the contact members and bearings and the coöperative engagement of the roller 16 and the notch 15 or the notch 17.

The effect of turning the run-back switch lever 14 into the position C can be seen by referring to Fig. 2. The contact pieces $c^1$ to $c^6$ are, by the said rotation, moved away from the fixed contact fingers $e^1$ to $e^6$ and the braking contact pieces $a^1$ to $a^6$ come into contact with the fixed contact $e^1$ to $e^6$, while the movable contact pieces $b^1$ to $b^4$ are disconnected from the fixed contact fingers $d^1$ to $d^6$ to interrupt the motor circuits. Under these conditions, each of the braking contact pieces $a^1$ to $a^6$, make contact with the correspondingly numbered fixed contact finger $e^1$ to $e^6$, when the following closed circuit is established through the motor 5, namely, from the brush 35 to fixed contact finger $d^3$, thence to cross connected fixed contact finger $e^1$ through braking contact piece $a^1$ and conductor 36 to braking contact piece $a^6$ and fixed contact finger $e^6$, thence to cross connected contact finger $d^{10}$, through the brake magnets R and R¹ or, instead thereof, regulating resistance, when desired, to contact finger $d^9$, to cross connected contact finger $e^5$, through braking contact piece $a^5$ and conductor 37 to braking contact piece $a^4$ and fixed contact finger $c^4$, to cross connected contact finger $d^7$, through the field winding 38 of the motor 5, to fixed contact finger $d^5$, to cross connected contact finger $e^3$, through braking contact piece $a^3$ and conductor 39 to braking contact piece $a^2$ and fixed contact finger $e^2$, to cross connected contact finger $d^1$ and the opposite brush 40 of the motor 5.

The braking circuit is shown in connection with a single motor for the sake of simplicity in the drawing; but it is evident that a closed circuit for two or more motors may be established in a similar manner, when desired. The motor 5, being thus short-circuited through the brake magnets or other resistances R and R¹, will generate a current and the vehicle which was commencing to run back will consequently be checked. In order to re-set the run-back switch 12, according to the arrangement shown, a switch contact piece 41 is provided which is secured to, and is operated by, the movement of the slidable bar 19 in such a manner that, when the solenoid 25 is energized, the contact piece 41 prepares the circuit of the other solenoid 26 through contact fingers 42 and 43, as shown in the drawing. When the run-back switch lever 14 has been moved into braking position C, as described above, and it is desired to return the same into its normal position shown in Fig. 1 of the drawing, the motorman, or other attendant, operates the controller 3 at the rear end of the vehicle to close the circuit of the solenoid 26 through the movable contact piece 10 and fixed contact pieces 6 and 7. Current is thus supplied from the trolley wire 1 through trolley 2, controller 3, winding of solenoid 26, contacts 42, 41 and 43 to ground. The solenoid 26, being thus energized, draws in its core and operates the bell crank lever 24 to move the slidable bar 19 to the right; the tappet 27 thus engages the left hand side of the depending lever 14 of the run-back switch 12 and moves said lever from the position C into the normal inoperative position A, at the same time, the switch contact piece 41 is also moved so as to interrupt the circuit between contact fingers 42 and 43 and to prepare the circuit of the other solenoid 25 through contact fingers 43 and 44. If it is desired to resume the former direction of travel, the controller 3 is moved to its zero position and the controller 4 is operated to start the vehicle in the desired forward direction of travel; the controller 4, on being thus operated, first closes the circuit of the solenoid 25 through the moving contact plate 10, controller contact fingers 6 and 7 and the switch contact fingers 44, 41 and 43 to ground. The solenoid 25, being thus energized, moves the sliding bar 19, together with the parts connected therewith, into the correct position for the forward direction of travel indicated by the arrow I in the drawing, and the vehicle can proceed in that direction until the run-back switch is again automatically operated or until it is desired to make the return journey.

When the forward direction of travel of the vehicle is to the left, as shown in the drawing, that is, when the axle 20 is rotated forwardly in a direction opposite to that indicated by the arrow II, the tappet 27 will have been moved, on commencing this journey, by means of the solenoid 26, into proximity to the depending lever 14 of the run-back switch 12. If the vehicle should now commence to run back, the tappet 27 will be engaged by the projection 34 on the axle 20 and will be moved to the right, thus causing the switch lever 14 to be moved into the operative position B. In this case, the row of braking contact pieces $a^1$ to $a^6$ will be moved into contact with the row of fixed contact fingers $d^1$ to $d^{10}$ and the closed circuit through the motor 5 thus established by the run-back switch 12 may be traced as follows:—from the brush 35 of the motor 5 to fixed contact finger $u^3$, through braking contact finger $a^2$ conductor 39 to braking contact piece $a^3$, to fixed contact finger $d^5$ through the field winding 38 of the motor 5 to fixed contact finger $d^7$, to braking contact piece $a^4$ through conductor 37 to braking contact piece $a^5$, to contact finger $d^9$ through resistance R to contact finger $d^{10}$, to braking contact piece $a^6$ through conductor 36 to braking contact piece $a^1$ to contact finger $d^1$ and to the other brush 40 of the motor 5.

It will be seen that, while the current flowing in the closed circuit traverses the armature of the motor 5 in the same direction as in the first case described above, it flows through the field magnet winding 38 in a direction opposite to that described in the said first case; this is the essential condition to enable a braking current to be generated by the motor 5 when the vehicle runs backward, as will be understood by those skilled in the art. The returning of the lever 14 of the run-back switch 12 into the normal inoperative position A and the restarting of the vehicle in the correct forward direction of travel will be easily understood from the above description of the operation of my invention when the vehicle is traveling forwardly to the right.

It is evident that my invention is not limited to the precise details of construction described above and illustrated in the drawing as considerable modifications may be made in these details without departing from the scope of my invention.

I claim as my invention:

1. In a vehicle, the combination with a dynamo-electric machine mechanically associated with a wheel of said vehicle, and a power-supply circuit for said machine, of an independent braking-circuit, and automatic mechanical means dependent for actuation upon backward movement of said vehicle to electrically disconnect said machine from said power-supply circuit and electrically connect the same to said independent braking-circuit.

2. In a vehicle, the combination with a dynamo-electric machine mechanically associated with a wheel of said vehicle, and a power-supply circuit for said machine, of an independent braking-circuit, a projection attached to said wheel, a plurality of stationary contact members and coöperating movable contact members, a common operating member upon which said movable members are severally mounted and which is adapted to separately make machine connections to said power-supply circuit and to said independent braking-circuit, respectively, and means dependent for actuation upon backward movement of said vehicle and interposed between said projection and said operating member to move said member to the braking-circuit position.

3. In a vehicle, the combination with a dynamo-electric machine mechanically associated with certain of the wheels of said vehicle, and a power-supply circuit for said machine, of an independent braking-circuit, a projection attached to one of the wheels of said vehicle, a plurality of stationary contact members and coöperating movable contact members, a common operating member upon which said movable members are severally separately mounted and which is adapted to normally make connections to said power-supply circuit, a slidable bar interposed between said projection and said operating member, and a plurality of one-way pawls severally mechanically associated with said bar and adapted to be yieldingly engaged by said projection during forward movement of said vehicle and to be rigidly engaged thereby during backward movement thereof, respectively, for actuating said operating member to disrupt the machine connection with said power-supply circuit and to connect said machine to said independent braking-circuit upon the occurrence of said backward movement.

4. In a vehicle, the combination with a dynamo-electric machine mechanically associated with certain of the wheels of said vehicle, and a power-supply circuit for said machine, of an independent braking-circuit, a projection attached to one of the wheels of said vehicle, a switching device which has a plurality of independent operative positions severally adapted to connect the braking circuit across the terminals of said machine and normally is adapted to connect said machine to said power-supply circuit, a slidable bar interposed between said projection and said switching device, and a plurality of one-way pawls resiliently separated from, and mechanically associated with, said bar and severally selectively adapted to be yieldingly engaged by said projection during corresponding forward movement of said vehicle and to be rigidly engaged thereby during corresponding backward movement thereof, respectively, for actuating said switching device to disrupt the machine connection with said power-supply circuit and to connect said machine to said independent braking-circuit upon the occurrence of said corresponding backward movement.

5. In a vehicle, the combination with a dynamo-electric machine, of automatic means dependent for actuation upon backward movement of said vehicle for causing said machine to act as an electric brake, and independent means for returning said automatic means to its original position under predetermined conditions.

6. In a vehicle, the combination with a dynamo-electric machine, of a braking circuit, automatic mechanical means, dependent for actuation upon backward movement of said vehicle, for connecting said machine to said braking circuit, and electrical means for disconnecting said machine therefrom under predetermined conditions.

7. In a vehicle, the combination with a dynamo-electric machine mechanically associated with certain of the wheels of said vehicle, and a power-supply circuit for said machine, of an independent braking-circuit, automatic mechanical means dependent for actuation upon backward movement of said vehicle, for electrically disconnecting said machine from said power-supply circuit and electrically connecting the same to said independent braking-circuit, and electrically-operated means for reconnecting said machine in the original manner to allow forward movement of said vehicle.

8. In a vehicle, the combination with a dynamo-electric machine mechanically associated with certain of the wheels of said vehicle, and a power-supply circuit for said machine, of an independent braking circuit, a projection attached to one of the wheels of said vehicle, a plurality of stationary contact members and coöperating movable contact members, a common operating member upon which said movable members are severally mounted and which is adapted to separately make machine connections to said power supply circuit or to said independent braking-circuit, respectively, means dependent for actuation upon backward movement of said vehicle and interposed between said projection and said operating member for moving said member to the braking-circuit position, and electro-magnetically actuated means for returning said operating member to the power-supply position to reallow forward movement of said vehicle.

9. In a vehicle, the combination with a dynamo-electric machine mechanically associated with certain of the wheels of said vehicle, and a power-supply circuit for said machine, of an independent braking-circuit, a projection attached to one of the wheels of said vehicle, a plurality of stationary contact members and coöperating movable contact members, a common operating member upon which said movable members are severally separately mounted and which is adapted to normally make connections to said power-supply circuit, a slidable bar interposed between said projection and said operating member, a plurality of one-way pawls severally mechanically associated with said bar and adapted to be yieldingly engaged by said projection during forward movement of said vehicle and to be rigidly engaged thereby during backward movement thereof, respectively, for actuating said operating member to disrupt the machine connection with said power-supply circuit and to connect said machine to said independent braking-circuit upon the occurence of said backward movement, and a plurality of electromagnetically-actuated levers for operating said slidable bar to return said operating member to the normal power-supply position to reallow forward movement of said vehicle.

10. In a vehicle, the combination with a dynamo-electric machine mechanically associated with certain of said wheels, and a power-supply circuit for said machine, of an independent braking-circuit, a projection attached to one of the wheels of said vehicle, a switching device which has a plurality of independent operative positions severally adapted to connect said braking circuit across the terminals of said machine and normally is adapted to connect said machine to said power-supply circuit, a slidable bar interposed between said projection and said switching device, a plurality of one-way pawls resiliently separated and mechanically associated with said bar and severally selectively adapted to be yieldingly engaged by said projection during corresponding forward movement of said vehicle and to be rigidly engaged thereby during corresponding backward movement thereof, respectively, for actuating said switching device to disrupt the machine connection with said power-supply circuit and to connect said machine to said independent braking-circuit upon the occurrence of said corresponding backward movement, a plurality of bell-crank levers having one end of each slidably attached to the opposite ends of said slidable bar, and a plurality of electro-magnets for selectively operating said levers and said bar to reset said switching device in the normal power-supply position to reallow forward movement of said vehicle.

In testimony whereof, I have hereunto subscribed my name this twenty-eighth day of April, 1913.

PERCY STUART TURNER.

Witnesses:
H. B. GREEN,
EUSTACE H. BARKER.